United States Patent [19]
Barrett

[11] 4,197,736
[45] Apr. 15, 1980

[54] BI-AXIAL LOAD CELL

[75] Inventor: Gary L. Barrett, Union Lake, Mich.

[73] Assignee: GSE, Inc., Farmington Hills, Mich.

[21] Appl. No.: 952,616

[22] Filed: Oct. 18, 1978

[51] Int. Cl.² .................... G01L 5/16; G01M 17/02
[52] U.S. Cl. ..................................... 73/133 R; 73/146
[58] Field of Search ......................... 75/9, 133 R, 146

[56]  References Cited
U.S. PATENT DOCUMENTS

| | | | |
|---|---|---|---|
| 2,859,613 | 11/1958 | Green . | |
| 2,866,059 | 12/1958 | Laimins . | |
| 3,004,231 | 10/1961 | Laimins . | |
| 3,075,160 | 1/1963 | Starr . | |
| 3,546,936 | 12/1970 | Tarpinian et al. | 73/146 |
| 3,780,573 | 12/1973 | Reus | 73/146 |
| 3,867,838 | 2/1975 | Gerresheim | 73/133 R |
| 3,948,080 | 4/1976 | Boyd | 73/9 |
| 3,985,025 | 10/1976 | Ormond . | |
| 3,994,161 | 11/1976 | Trozera . | |
| 4,023,404 | 5/1977 | Brendel | 73/133 R |

*Primary Examiner*—Charles A. Ruehl
*Attorney, Agent, or Firm*—Krass & Young

[57]  ABSTRACT

A load cell for measuring the rolling resistance of a tire as a function of a load placed on the tire. The cell includes a block having major parallel surfaces and a centrally disposed opening through which a shaft coupled to the tire rotates. An inner hub surrounding the opening and an outer hub are connected by a plurality of beams. Each beam is defined by a first pair of bores on the periphery of the inner hub and a second pair of bores in the outer hub. The first pair of bores are connected by a recessed web portion, as is the second pair of bores. The thickness of the first web portion relative to the major surfaces of the block is greater than the thickness of the other web. A first strain gage in one bore of the second pair and a second strain gage in the other bore of the second pair sense the rolling resistance of the tire along one axis and the loading force applied to the tire along another axis, respectively.

13 Claims, 9 Drawing Figures

BI-AXIAL LOAD CELL

BACKGROUND OF THE INVENTION

This invention relates to sensors for measuring the strength of applied forces. More particularly, it involves a bi-axial load cell for measuring the rolling resistance of a tire along one axis, and for measuring the test load placed on the tire along a different axis.

It has been commonplace to measure the frictional forces between a tire and a surface as a function of a load placed on the tire, such load representing the weight of a vehicle. In such manner, the tread designs, materials, etc., of the tire can be designed to exactly match the expected load range of the vehicle on which it is to be used. Typically, the load to be placed on the tire may run as high as 4,000 lbs. Due to such high load factors, the prior art method of measuring the frictional engagement of the tire with respect to the surface on which it rides, commonly referred to as the rolling resistance of the tire, employed a plurality of load cells. The tire was coupled to the middle portions of a shaft and both ends of the shaft were rotatably mounted in its own load cell. In other words, the prior art method necessitated the use of two load cells placed on either side of the tire to measure the rolling resistance of the tire as a function of a vertically placed load on the tire. Unfortunately, not only does the use of this two load cell arrangement tend to be costly, the electronics needed to match the two devices in order to get a meaningful reading also needs to be relatively sophisticated.

OBJECTS AND SUMMARY OF THE INVENTION

Therefore, it is a primary object of this invention to provide a rigid bi-axial load cell that is capable of measuring the rolling resistance of a tire with relatively large loads applied thereto.

It is a further object of this invention to provide an easily manufactured load cell which permits the above measurement through relatively inexpensive test apparatus.

These and other objects of this invention are accomplished by making the load cell out of a block having two major parallel surfaces and a centrally disposed opening therethrough about which a shaft coupled to the tire rotates. The other end of the shaft is coupled to a flange for attaching the tire. Means are included for defining an inner hub portion whose periphery surrounds the opening. A plurality of beams, preferably four in number, connect the inner hub to the remaining portions of the block which define an outer hub. Each of the beams are defined by a first pair of bores on the periphery of the inner hub and the second pair of bores in the outer hub. The first pair of bores are connected by a first recessed web portion, with the second pair of bores being connected by a second web portion. The thickness of the first web portion relative to the major surfaces of the block is greater than the thickness of the second web. In such manner, the load cell can withstand large shearing stresses created by the large loads placed on the tire. Strain gages placed in the bores of the second pair of bores defining each beam are connected to bridge networks for measuring the rolling resistance and loading forces of the tire, respectively.

In a preferred embodiment, stop means are also included for limiting the amount of lateral movement of the inner hub relative to the outer hub to provide overload protection for the device. Advantageously, the inner hub is defined by slots extending through the major surfaces of the block and connected to bores of adjacent beams. Thus, the bi-axial load cell of the present invention provides a rigid structure which can withstand large loading forces to the tire. Accordingly, only one load cell needs to be utilized to measure both the rolling resistance of the tire and the relatively large test loading forces applied to it. The unique design of the load cell of the present invention can be easily manufactured thereby reducing costs, but without sacrificing the accuracy of the measurement.

BRIEF DESCRIPTION OF THE DRAWINGS

These and other objects and advantages of the present invention will become more apparent upon reading the foregoing specification and by reference to the drawings in which.

DESCRIPTION OF THE PREFERRED EMBODIMENTS

Figure 1:
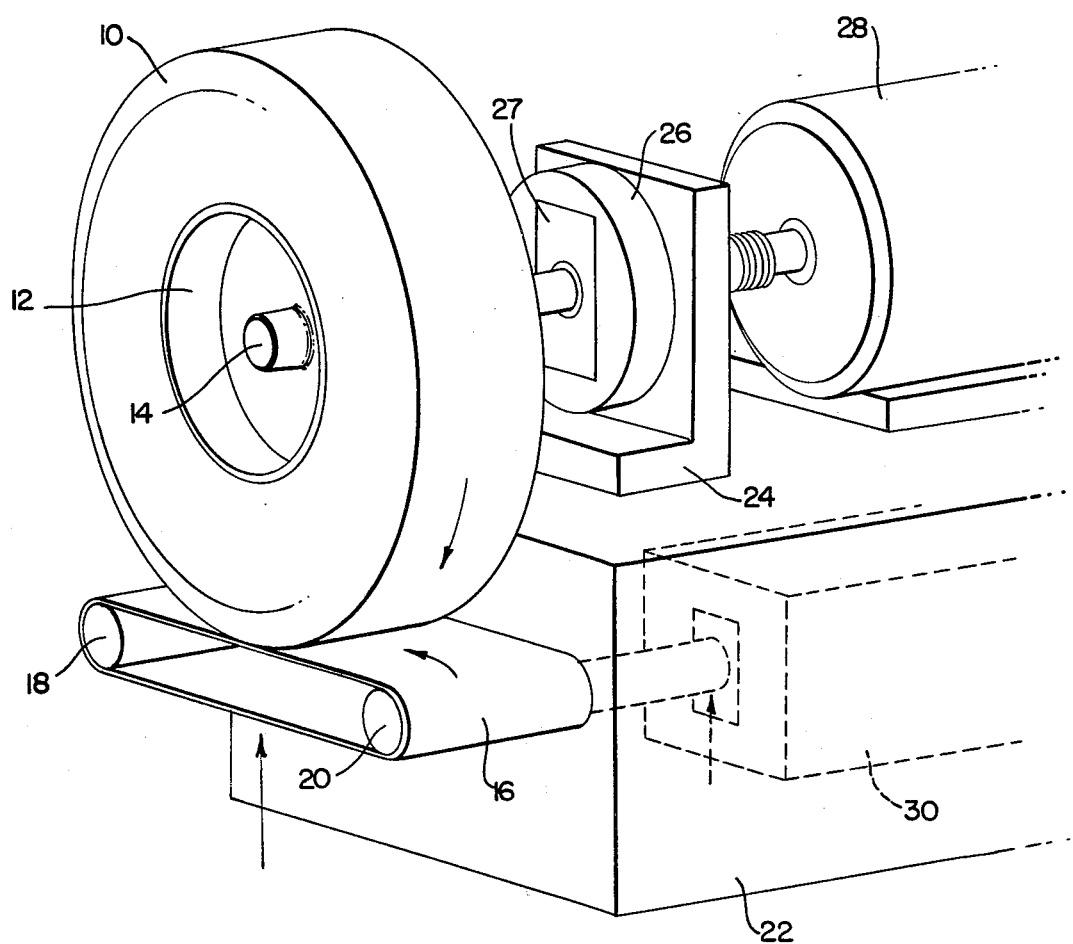
FIG. 1 illustrates a test stand which includes the load cell of the present invention for measuring the rolling resistance of the tire.

Turning now to FIG. 1, there is shown an assembly of equipment for measuring the rolling resistance of a tire as a function of an applied load. Throughout the specification and claims, the terms vertical and horizontal will be referenced to the relationship of the elements shown in FIG. 1. It should be noted, however, that this terminology is used to aid the reader in ascertaining the relationship of the various elements with respect to one another. However, their relationship to the horizon can be changed if desired. With that understanding, a vertically disposed tire 10 is mounted on a flange 12 coupled to the end of a horizontally disposed shaft 14. A treadmill 16 disposed beneath the surface of tire 10 is journaled about two axles 18 and 20 coupled to table 22. An L-shaped bracket 24 has its foot portion affixed to the upper surface of table 22. A load cell 26 is vertically secured to the upright portion of bracket 24. Shaft 14 passes through load cell 26 and is coupled at its opposite end to a motor 28 for rotating tire 10. Means are provided for establishing a vertical load on tire 10. Various means known in the art can be utilized to accomplish this function. In the embodiment shown in FIG. 1, the ends of axles 18 and 20 are coupled to a hydraulic lift 30 for providing the desired upward force. The function of load cell 26 is to measure the rolling resistance between the surfaces of tire 10 and treadmill 16 as a function of the applied loading force. The rolling resistance will be due to the frictional forces between tire 10 and treadmill 16 along a horizontal axis, whereas the loading force will be along the vertical axis.

Figure 2:
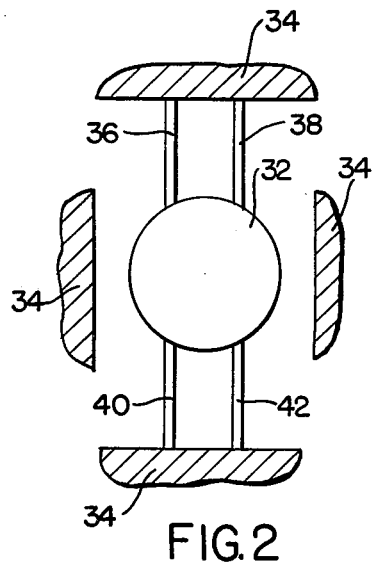
FIG. 2 is a schematic diagram showing the load cell in an unloaded condition.
Figure 3:
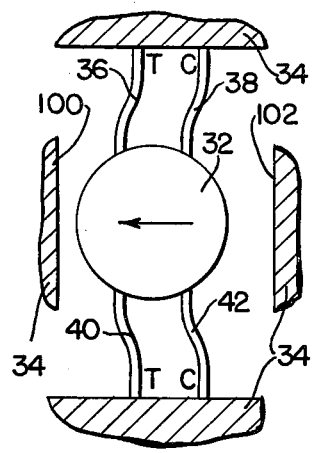
FIG. 3 is a schematic diagram showing the load cell encountering a horizontally applied force corresponding to the rolling resistance of the tire.
Figure 4:
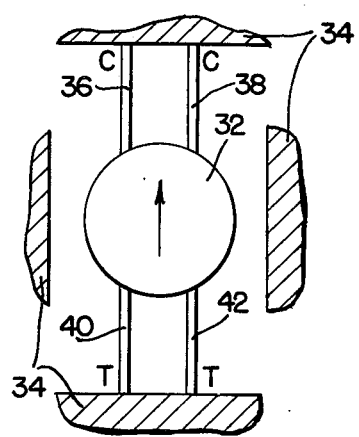
FIG. 4 is a schematic diagram showing the load cell encountering a vertical force corresponding to the load applied to the tire.

FIGS. 2, 3, and 4 are mechanical schematics of load cell 26. Load cell 26 can be envisioned as having an inner hub 32 and an outer hub 34 with the inner hub and outer hub being connected by four beams 36, 38, 40, and 42. In FIG. 2, the cell is shown in an unloaded condition. FIG. 3 shows the forces on the beams due to the rolling resistance of the tire. FIG. 4 shows the relative stresses on the beams due to the vertically applied loading force to the tire. The letters T and C denote tension and compression forces, respectively, on the beams. The letters T and C also represent the positions of the strain gages utilized to measure these forces on the beams.

Figure 5:
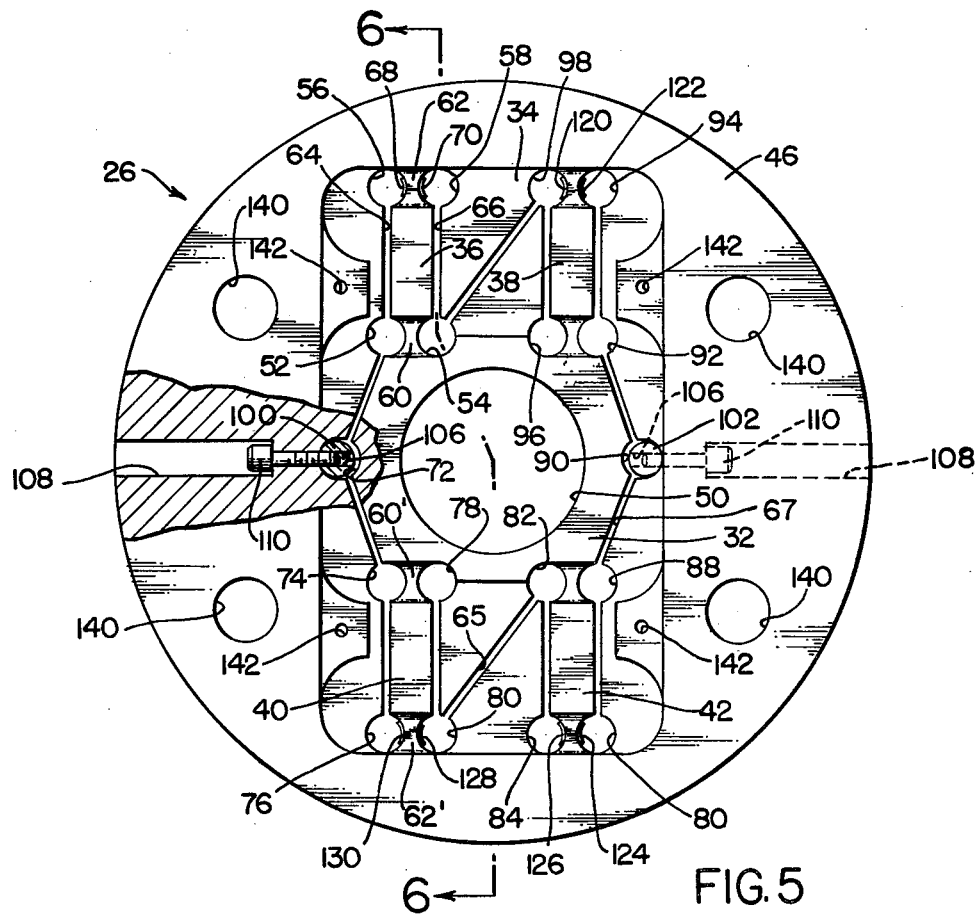
FIG. 5 is a top plan view of the load cell according to one embodiment of the present invention.
Figure 6:
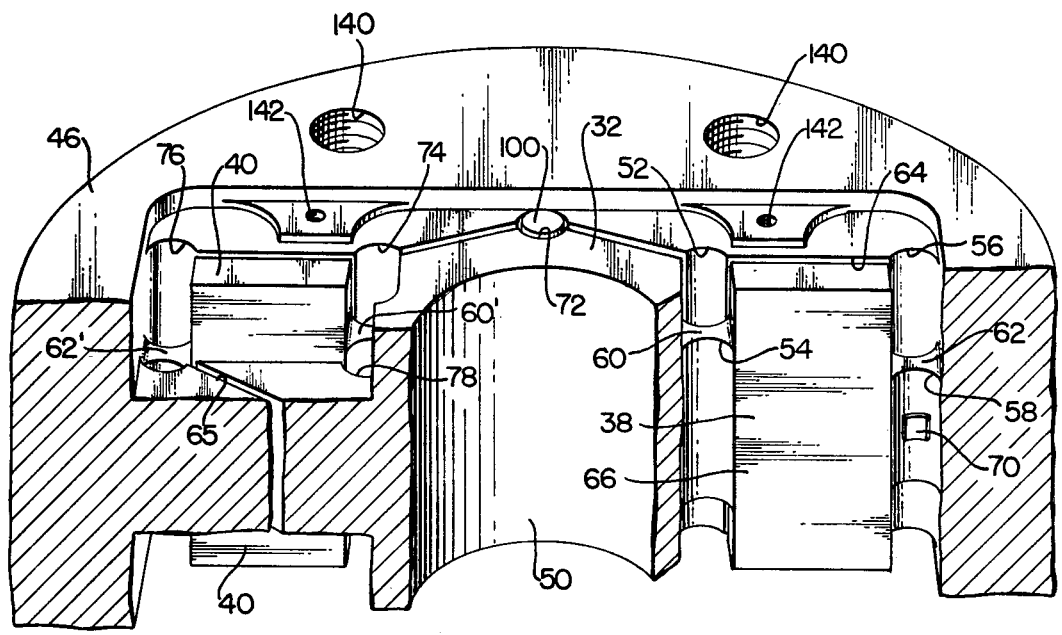
FIG. 6—6 is an isometric view along the line 6—6 of FIG. 5.
Figure 7:
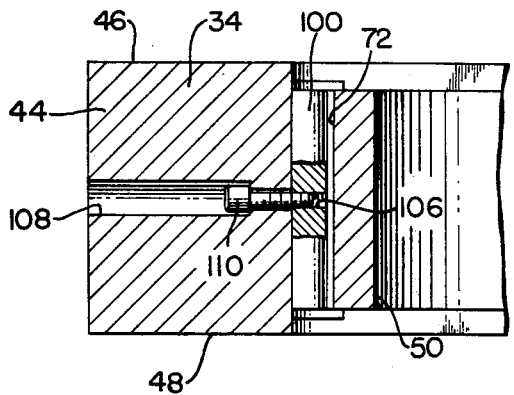
FIG. 7 is a cross-sectional view along the lines 7—7 of FIG. 6.

Special attention should now be drawn to FIGS. 5-7 in which the details of the bi-axial load cell of the present invention are illustrated. For ease in understanding the invention with respect to the schematic diagrams shown in FIGS. 2-4, the same reference numerals will be utilized to refer to common elements. Load cell 26 is constructed of a solid block 44 of aluminum. In this embodiment, block 44 is disc shaped and has two major parallel surfaces 46 and 48. An opening 50 centrally disposed in block 44 is provided for mounting shaft 14 therethrough. Inner hub 32 surrounds opening 50 and the remaining portions of block 44 form the outer hub 34. The beams 36, 38, 40 and 42, are each defined by two pairs of adjacent bores extending completely through block 44. With particular reference to beam 36, a first pair of bores, 52 and 54, are located about the periphery of inner hub 32. A second pair of bores, 56 and 58, are located in outer hub 34 vertically above bores 52 and 54, respectively. Bores 52 and 54 are horizontally connected together by a recessed web 60. Similarly, bores 56 and 58 are coupled together by web 62. An important aspect of this invention is that the thickness of web 60 relative to the major surfaces 46 and 48 is thicker than web 62 as can be seen most clearly in FIG. 6. The vertical portions of beam 36 are defined by slots 64 and 66 coupling bores 52, 56 and 54, 58, respectively. Slots 64, 66 can be conveniently manufactured by saw cuts extending through block 44. Strain gages 68 and 70 are disposed in bores 56 and 58, respectively. Strain gages 68 and 70 are well known devices whose electrical resistance changes as a function of the strain applied thereto. Gages 68 and 70 are disposed midway between surfaces 46 and 48 nearest the vertical center line of beam 36. With reference to FIGS. 3 and 4, gage 70 corresponds to the letter T in the upper lefthand portion of FIG. 3, whereas gage 68 corresponds with the letter C in the upper lefthand portion of FIG. 4. Each of the beams 38, 40 and 42, are constructed exactly the same as beam 36. Accordingly, a further detailed description is not warranted for a full understanding of this invention.

Another aspect of this invention is the use of the saw cuts to define the inner hub 32 with respect to the outer hub 34. Beginning with the lefthand portion of FIG. 5 and moving counterclockwise, the saw cut 64 passes through the center line of bores 56, 52, 72, 74, and 76. Saw cut 65 couples bores 78, 80, 82, and 84 together. Saw cut 67 couples bores 86, 88, 90, 92, and 94 together. Similarly, saw cut 66 couples bores 96, 98, 54, and 58 together.

Still another aspect of this invention is the provision of means for restricting the amount of horizontal movement of the inner hub 32 so as to provide an overload protection for the device. This is necessary because the capacity of the tire resistance load cells are necessarily low with respect to the horizontal axis in order to provide a sensitive reading to the relatively low rolling resistance forces. However, an accidentally placed horizontal load on the tire 10 could result in catastrophic damage to such load cells. Accordingly, protuberances are provided on diametrically opposite portions of outer hub 34 along a horizontal axis to provide a stop member for limiting the amount of deflection of inner hub 32. The spacing of these protuberances are, of course, of such distance to allow the normal deflection of the inner hub 32 that would normally be encountered when sensing the rolling resistance forces of tire 10. However, if an extraneous force is applied along the horizontal axis, the protuberances will limit the movement of inner hub 32 relative to outer hub 34 so as to not break the connecting beams which could otherwise result. In this embodiment, this overload protection is provided by pins 100 and 102 in bores 72 and 90, respectively. As can be seen most clearly in FIG. 7, pins 100 and 102 each include a threaded aperture 106 normal to its major longitudinal axis. Block 44 includes countersunk holes 108 extending parallel to the major surfaces of block 44 from its outer circumference to bores 72, 90. A screw 110 is utilized to engage threaded aperture 106 to urge pins 100, 102 against outer hub 34. Pins 100 and 102 are smaller than their respective bores 72 and 90. Consequently, when urged against the outer hub 34 by screws 110, a space is provided between the pins and the inner hub 32. Reference to FIG. 3 may aid in visualizing the function of pins 100 and 102. As can be seen in FIG. 3, an unusually large horizontal force on inner hub 32 would cause it to abut either pin 100 or 102 depending upon the direction of the horizontal force.

Figure 8:
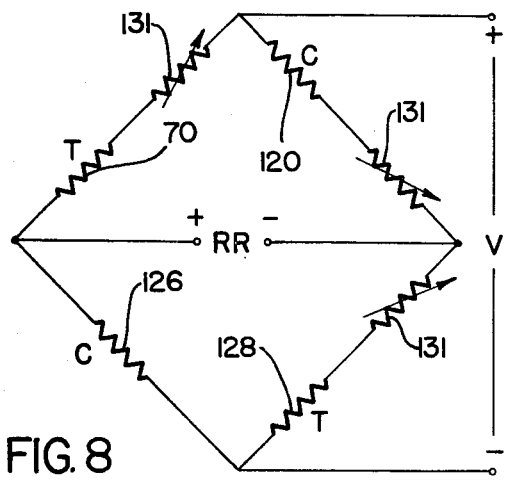
FIG. 8 is a circuit diagram illustrating the electrical connections to the strain gages in the load cell for measuring the rolling resistance of the tire.
Figure 9:
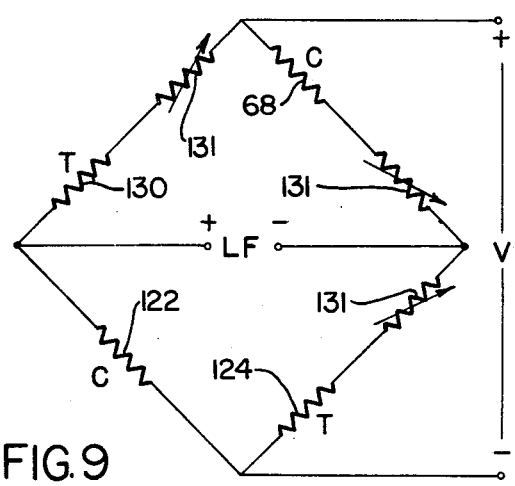
FIG. 9 is a circuit diagram illustrating the electrical connections to other strain gages in the load cell for measuring the loading forces to the tire.

Referring now to FIGS. 8 and 9, the strain gages are connected into known Wheatstone bridge networks for measuring the rolling resistance of tire 10 and the loading force thereon, respectively. Strain gages 70 and 128 in beams 36 and 40 measure the tensile forces in their respective beams. Gages 112 and 116 in beams 38 and 42 measure the compressive forces in their respective beams. The amount of beam deflection is proportional to the amount of rolling resistance of tire 10. Accordingly, the output RR of the bridge network shown in FIG. 8 will vary proportionally to the amount of rolling resistance. This is due to the changing resistance of the gages therein which unbalance the bridge and provide a potential difference acrossed it as is known in the art. In a similar manner, the bridge network shown in FIG. 9 measure the amount of vertical load applied to tire 10. Gages 68 and 122 measure the compressive force in beams 36 and 38 respectively. Gages 124 and 130 in beams 42 and 40, respectively, measure the tensile forces in their respective beams. Accordingly, the potential difference across the nodes labeled LF of the network shown in FIG. 9 measures the vertical loading force on tire 10. Trim potentiometers 131 can be included in each bridge network to initially adjust the outputs to zero the device under no load conditions and to minimize cross-talk between each output, i.e. so that a force along one axis will not cause a resultant change in the network sensing the forces on the opposite axis.

In operation, load cell 26 is mounted on the upright portion of bracket 26 via bolts (not shown) which extend through mounting holes 40 in outer hub 34 to rigidly secure the device to a fixed surface. A cover plate 27 is conveniently attached to the inner portions of cell 26 as shown in FIG. 1 via mounting holes 142. The load cell of the present invention provides the unique ability to measure tire rolling resistance by much more simple apparatus that in the prior art. In the prior art, tandem load cells on either side of tire 10 were required. In comparison, load cell 26 can withstand the vertical loading forces on tire 10 to such a degree that only one load cell is needed which is mounted on one side of tire 10 via shaft 14. The utilization of the bores and the saw cuts to define the inner hub and beams for the load cell 26 substantially decreases the cost of manufacturing the load cell. Moreover, the proportion thicknesses of webs 60 and 62 for the beams provide the load cell 26 with the ability to withstand the high shearing forces nearest shaft 14 while at the same time providing increased flexibility at the beam portions furthest away from shaft 14 where the shearing forces are not as great. Moreover, the overload stop protection for the inner hub 32 provides a failsafe mechanism which prolongs the useful life of the device.

Therefore, while this invention has been described in connection with particular embodiments thereof, no limitation is intended thereby except as defined in the appended claims.

The embodiments of the invention in which an exclusive property or privilege is claimed are defined as follows:

1. A load cell for measuring the rolling resistance of a tire as a function of a load placed on the tire, said cell comprising:
    a block having first and second major parallel surfaces and a centrally disposed opening therethrough about which a shaft coupled to the tire rotates;
    means defining an inner hub portion whose periphery surrounds said opening;
    a plurality of beams connecting said inner hub to the remaining portions of the block defining an outer hub, each of said beams being defined by a first pair of bores on the periphery of the inner hub and a second pair of bores in the outer hub, said first pair of bores being connected by a first recessed web portion and said second pair of bores being connected by a second recessed web portion, with the thickness of said first web portion relative to the major surfaces being greater than the thickness of said second web portion, a first strain gage in one bore of the second pair and a second strain gage in the other bore of the second pair, said first gage in each beam being connected to a bridge network for measuring the rolling resistance of the tire, and said second gage in each beam being connected to a bridge network for measuring the loading force to the tire.

2. The cell of claim 1 wherein said plurality of beams comprise four in number, with two of the beams extending vertically upwardly from the inner hub to the outer hub, and two of the beams extending vertically downwardly from the inner hub to the outer hub.

3. The cell of claim 2 wherein said inner hub is defined by slots extending through the block and connecting the bores of adjacent beams.

4. The cell of claim 3 which further comprises stop means for limiting the amount of horizontal movement of the inner hub relative to the outer hub thereby providing overload protection for the cell.

5. The cell of claim 4 wherein said stop means comprises protuberances coupled to said outer hub diametrically opposite each other along a substantially horizontal axis.

6. The cell of claim 4 wherein said stop means comprises two bores of a given diameter extending through the major surfaces of the block at diametrically opposite points about the periphery of the inner hub, a pin in each of said bores, said pins having a diameter less than that of its respective bore, and means for coupling the sides of the pins to the outer hub.

7. Apparatus for measuring the rolling resistance of a tire as a function of a vertically applied load thereto, said apparatus comprising:
    a vertically disposed load cell affixed to a rigid surface, said load cell having a centrally disposed opening therein located about a horizontal axis;
    a shaft having a flange at one end coupled to the tire, said shaft being rotatably mounted in the opening in said load cell spaced from the tire;
    means for presenting a surface for contacting the tire;
    means for applying a substantially vertical load to the tire;
    said load cell including a block having two major parallel surfaces, means defining an inner hub whose periphery surrounds said opening about which said shaft rotates, a plurality of beams connecting said inner hub to the remaining portions of the block defining an outer hub, each of said beams being defined by a first pair of bores on the periphery of said inner hub and a second pair of bores in the outer hub, said first pair of bores being connected by a first recessed web portion and said second pair of bores being connected by a second recessed web portion, with the thickness of said first web portion relative to the major surfaces of the block being greater than the thickness of said second web portion, a first strain gage in one bore of the second pair of bores, and a second strain gage in the other bore of the second pair, said first gage in each beam being connected to a bridge network for measuring the rolling resistance of the tire along a substantially horizontal axis, and the second gage in each beam being connected to a bridge network for measuring the vertically applied loading force to the tire.

8. The apparatus of claim 7 wherein said plurality of beams comprises four in number, with two of the beams extending vertically upwardly from the inner hub to the outer hub, and two of the beams extending vertically downwardly from the inner hub to the outer hub.

9. The apparatus of claim 8 wherein said hub is defined by slots extending through the block and connecting the bores of adjacent beams.

10. The apparatus of claim 9 which further comprises stop means for limiting the amount of horizontal movement of the inner hub relative to the outer hub thereby providing overload protection for the cell.

11. The apparatus of claim 10 wherein said stop means comprises protuberances coupled to said outer hub diametrically opposite each other along a substantially horizontal axis.

12. The apparatus of claim 10 wherein said stop means comprises two bores of a given diameter extending through the major surfaces of the block at diametrically opposide points about the periphery of the inner hub, a pin in each of said bores, said pins having a diameter less than that of its respective bore, and means for coupling the sides of the pins to the outer hub.

13. The apparatus of claim 7 which further comprises a trim potentiometer in at least one leg of said bridge networks.

* * * * *